US010744408B2

(12) United States Patent
Ohara et al.

(10) Patent No.: US 10,744,408 B2
(45) Date of Patent: Aug. 18, 2020

(54) INFORMATION PROCESSING SYSTEM, INFORMATION PROCESSING METHOD, INFORMATION PROCESSING PROGRAM, COMPUTER-READABLE RECORDING MEDIUM STORING THE SAME PROGRAM, DATA STRUCTURE, INFORMATION PROCESSING SERVER, AND INFORMATION PROCESSING TERMINAL

(75) Inventors: Kazuki Ohara, Tokyo (JP); Toshiya Ikenaga, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 461 days.

(21) Appl. No.: 14/351,752

(22) PCT Filed: Jun. 18, 2012

(86) PCT No.: PCT/JP2012/065547
§ 371 (c)(1),
(2), (4) Date: Apr. 14, 2014

(87) PCT Pub. No.: WO2013/065350
PCT Pub. Date: May 10, 2013

(65) Prior Publication Data
US 2014/0317566 A1    Oct. 23, 2014

(30) Foreign Application Priority Data

Nov. 1, 2011    (JP) .................. 2011-240518

(51) Int. Cl.
*G06F 3/0482*    (2013.01)
*A63F 13/48*    (2014.01)
(Continued)

(52) U.S. Cl.
CPC .............. *A63F 13/48* (2014.09); *A63F 13/30* (2014.09); *A63F 13/45* (2014.09); *A63F 13/822* (2014.09);
(Continued)

(58) Field of Classification Search
CPC .. G07F 17/3239; G07F 17/3272; G07F 17/32; G07F 17/326; G07F 17/3227;
(Continued)

(56) References Cited

U.S. PATENT DOCUMENTS 5,592,609 A * 1/1997 Suzuki .................... A63F 13/10
345/473
6,115,036 A * 9/2000 Yamato ................... A63F 13/10
715/723
(Continued)

FOREIGN PATENT DOCUMENTS

CN    101001682 A    7/2007
CN    101517537 A    8/2009
(Continued)

OTHER PUBLICATIONS

International Preliminary Report on Patentability and Written Opinion for corresponding PCT JP2012/065547, dated May 15, 2014.
(Continued)

*Primary Examiner* — Sang H Kim
(74) *Attorney, Agent, or Firm* — Matthew B. Dernier, Esq.

(57) ABSTRACT

Methods and apparatus operate to: execute one application; store group information, the group information being associated with a plurality of pieces of execution status information each of which represents one of a plurality of execution statuses of the execution, a plurality of pieces of content information each of which represents one of the contents of the plurality of pieces of execution status infor-
(Continued)

mation, and group identification information identifying groups to which the plurality of pieces of execution status information and the plurality of pieces of content information belong; and generate, based on the group information, menu information which displays the content information included in at least one of the groups. The at least one application is executed using the execution status information associated with at least one piece of the content information included in the menu information.

10 Claims, 7 Drawing Sheets

(51) Int. Cl.
 *A63F 13/822* (2014.01)
 *G06F 8/38* (2018.01)
 *A63F 13/45* (2014.01)
 *A63F 13/30* (2014.01)

(52) U.S. Cl.
 CPC ........ *G06F 8/38* (2013.01); *A63F 2300/5533* (2013.01); *A63F 2300/807* (2013.01)

(58) Field of Classification Search
 CPC ............. G07F 17/3262; G07F 17/3276; G07F 17/3267; G07F 17/3223; G06F 3/0482; G06F 2221/2109; A63F 13/10; A63F 9/24; A63F 13/79; A63F 2300/65; A63F 13/00; A63F 13/798; A63F 13/67; A63F 2300/636; A63F 13/803; A63F 13/65; A63F 13/45; A63F 13/58; A63F 13/537; A63F 2300/5566
 See application file for complete search history.

(56) References Cited

U.S. PATENT DOCUMENTS

| | | | | |
|---|---|---|---|---|
| 2002/0090987 A1* | 7/2002 | Walker | ................... | G07F 17/32 463/16 |
| 2005/0096110 A1* | 5/2005 | Ohyagi | ................... | A63F 13/10 463/6 |
| 2007/0060359 A1* | 3/2007 | Smith | ................ | A63F 13/5258 463/42 |
| 2009/0005139 A1* | 1/2009 | Morimoto | ............... | A63F 13/10 463/6 |
| 2009/0325707 A1* | 12/2009 | Ichimura | ................ | A63F 13/32 463/40 |
| 2010/0017190 A1* | 1/2010 | Tanaka | .................... | A63F 13/02 703/25 |
| 2010/0184498 A1* | 7/2010 | Takahashi | ............... | A63F 13/10 463/8 |
| 2011/0319170 A1* | 12/2011 | Shimura | ................. | A63F 13/12 463/42 |
| 2012/0157197 A1* | 6/2012 | Watkins, Jr. | ........... | G06Q 10/00 463/30 |
| 2012/0322545 A1* | 12/2012 | Arnone | ............... | G07F 17/3272 463/25 |
| 2016/0256782 A1* | 9/2016 | Tucker | ................... | A63F 13/33 |

FOREIGN PATENT DOCUMENTS

| | | |
|---|---|---|
| JP | 2003320164 A | 11/2003 |
| JP | 2005252433 A | 9/2005 |

OTHER PUBLICATIONS

International Search Report for corresponding PCT JP2012/065547, dated Aug. 21, 2012.
Zwei 2 Koshiki, Perfect Guide, 1st edition, Shinkigensha Co., Ltd., 3 Pages, Feb. 17, 2009 (For relevance, see ISR for corresponding PCT JP2012/065547, dated Aug. 21, 2012).
Office Action for corresponding CN Application 201280052408.2, dated Aug. 5, 2015.

* cited by examiner

FIG. 8

| GROUP ID | EXECUTION STATUS INFO. ID | CONTENT INFO. ID | GAME ID | PRIORITY INFO. | CONDITIONAL INFO. ID |
|---|---|---|---|---|---|
| G1 | SA | CA | g1 | 1 | R1 |
|    | SB | CB | g1 | 2 | R2 |
|    | SF | CF | g1 | 3 | R3 |
|    | SG | CG | g1 | 4 | R4 |
|    | SC | CC | g1 | 1 | R5 |
| G2 | SD | CD | g2 | 1 | R6 |
|    | SH | CH | g3 | 1 | R7 |
|    | SI | CI | g4 | 1 | R8 |
| G3 | SD | CD | g2 | 1 | R9 |
|    | SE | CE | g2 | 1 | R10 |
|    | SI | CI | g4 | 1 | R8 |
|    | SJ | CJ | g4 | 1 | R11 |

INFORMATION PROCESSING SYSTEM, INFORMATION PROCESSING METHOD, INFORMATION PROCESSING PROGRAM, COMPUTER-READABLE RECORDING MEDIUM STORING THE SAME PROGRAM, DATA STRUCTURE, INFORMATION PROCESSING SERVER, AND INFORMATION PROCESSING TERMINAL

TECHNICAL FIELD

The present invention relates to an information processing system, information processing method, information processing program, computer-readable recording medium storing the same program, data structure, information processing server, and information processing terminal.

BACKGROUND ART

A technology is known which allows an application, designed for execution on a dedicated console, to be executed using an emulator, for example, on a different device.

SUMMARY

Technical Problem

For example, if the application is a game program that is composed of a plurality of stages and in which a player progresses from one stage to another, the user may wish to select only a desired stage with ease and play the game. On the other hand, in the case of a plurality of game programs that make up a series such as so-called RPG games (Role-Playing Games), for example, the user may wish to select only some of the stages (e.g., battle with the last enemy character) of the plurality of game programs with ease and play the games.

The present invention has been devised in light of the foregoing, and it is an object of the present invention to provide an information processing system, an information processing method, an information processing program, and a computer-readable recording medium storing the same program which manage, as a group, a plurality of pieces of execution status information representing execution statuses of execution means adapted to execute an application.

Solution to Problem (1) An information processing system of the present invention includes: execution means adapted to execute at least one application; group information storage means adapted to store group information, the group information being associated with a plurality of pieces of execution status information each of which represents one of a plurality of execution statuses of the execution means, a plurality of pieces of content information each of which represents one of the contents of the plurality of pieces of execution status information, and group identification information identifying groups to which the plurality of pieces of execution status information and the plurality of pieces of content information belong; and menu information generation means adapted to generate, based on the group information, menu information which displays the content information included in at least one of the groups. The execution means executes the at least one application using the execution status information associated with at least one piece of the content information included in the menu information.

(2) The information processing system of (1) further includes: execution information acquisition means adapted to acquire execution information of the execution means adapted to acquire execution information based on execution of the at least one application; and determination means adapted to determine whether the execution information acquired by the execution information acquisition means matches a given condition. The information processing system terminates the execution of the at least one application by the execution means in accordance with the determination result of the determination means.

(3) In the information processing system of (2), the execution information includes image information based on the execution of the at least one application.

(4) In the information processing system of any one of (1) to (3), the execution information acquired by the execution information acquisition means includes execution status information representing the execution status of the execution means, and the plurality of pieces of execution status information includes the execution status information acquired by the execution information acquisition means.

(5) In the information processing system of any one of (1) to (4), the group information is further associated with priority identification information identifying the priority representing the sequence of execution of the execution status information included in the group, and the execution means acquires the execution status information based on the priority information and executes the at least one application.

(6) The information processing system of (4) further includes partial information acquisition means adapted to acquire partial information representing given information of the execution information acquired by the execution information acquisition means. The execution means further executes the at least one application using the partial information.

(7) In the information processing system of any one of (1) to (6), the group information is further associated with application identification information identifying the application to be executed using each piece of the execution status information, and the execution means executes the application identified by each piece of the application identification information.

(8) An information processing program of the present invention causes a computer to function as: execution means adapted to execute at least one application; group information storage means adapted to store group information, the group information being associated with a plurality of pieces of execution status information each of which represents one of a plurality of execution statuses of the execution means, a plurality of pieces of content information each of which represents one of the contents of the plurality of pieces of execution status information, and group identification information identifying groups to which the plurality of pieces of execution status information and the plurality of pieces of content information belong; and menu information generation means adapted to generate, based on the group information, menu information which displays the content information included in at least one of the groups. The execution means executes the at least one application using the execution status information associated with at least one piece of the content information included in the menu information.

(9) A computer-readable recording medium storing the information processing program of (8).

(10) A data structure relates to group information. The group information includes: a plurality of pieces of execution status information each of which represents one of a plurality of execution statuses of execution means adapted to execute at least one application; a plurality of pieces of content information each of which represents one of the contents of the plurality of pieces of execution status information; and group identification information identifying groups to which the plurality of pieces of execution status information and the plurality of pieces of content information belong. The group information is used to display the content information included in at least one of the groups.

(11) An information processing server includes: execution means adapted to execute at least one application; and menu information generation means adapted to acquire group information, the group information being associated with a plurality of pieces of execution status information each of which represents one of a plurality of execution statuses of the execution means, a plurality of pieces of content information each of which represents one of the contents of the plurality of pieces of execution status information, and group identification information identifying groups to which the plurality of pieces of execution status information and the plurality of pieces of content information belong, the menu information generation means also adapted to generate, based on the group information, menu information which displays the content information included in at least one of the groups. The execution means executes the at least one application using the execution status information associated with at least one piece of the content information included in the menu information.

(12) An information processing terminal includes: menu information acquisition means adapted to acquire menu information which displays content information included in at least one of groups based on group information, the group information being associated with a plurality of pieces of execution status information each of which represents one of a plurality of execution statuses of execution means adapted to execute at least one application, the plurality of pieces of content information each of which represents one of the contents of the plurality of pieces of execution status information, and group identification information identifying the groups to which the plurality of pieces of execution status information and the plurality of pieces of content information belong; and display means adapted to display the content information based on the acquired menu information. The execution means executes the at least one application using the execution status information associated with at least one piece of the content information included in the menu information.

(13) An information processing method includes: executing at least one application using execution means; storing group information, the group information being associated with a plurality of pieces of execution status information each of which represents one of a plurality of execution statuses of the execution means, a plurality of pieces of content information each of which represents one of the contents of the plurality of pieces of execution status information, and group identification information identifying groups to which the plurality of pieces of execution status information and the plurality of pieces of content information belong; and generating, based on the group information, menu information which displays the content information included in at least one of the groups. The execution means executes the at least one application using the execution status information associated with at least one piece of the content information included in the menu information.

BRIEF DESCRIPTION OF DRAWINGS

FIG. 8 is a diagram illustrating an example of information stored in a group information storage section according to the embodiment of the present invention.

DESCRIPTION OF EMBODIMENT

Figure 1:
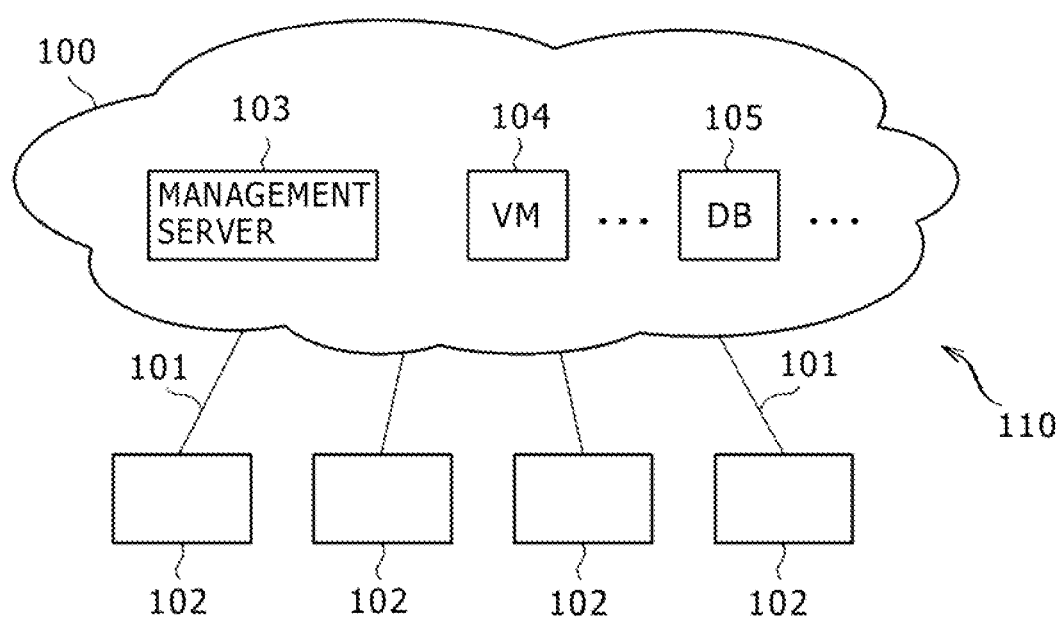
FIG. 1 is a diagram for describing an example of an information processing system according to an embodiment of the present invention.

A description will be given below of an embodiment of the present invention with reference to the accompanying drawings. It should be noted that the same or like elements in the drawings will be denoted by the same reference symbols, and that redundant description will be omitted.

FIG. 1 is a diagram for describing an example of an information processing system according to the embodiment of the present invention. As illustrated in FIG. 1, an information processing system 110 according to the present embodiment includes a cloud infrastructure 100 and one or a plurality of terminals 102. The cloud infrastructure 100 and the terminals 102 are connected together via a network 101.

The cloud infrastructure 100 includes a management server 103, one or a plurality of virtual machines (VMs) 104 which will be described later, and one or a plurality of databases (DBs) 105. It should be noted that the term "cloud infrastructure 100" here is a so-called pattern of using computers based on the network 101 and refers to an infrastructure for users to use computer processing by way of a network as services.

Figure 2:
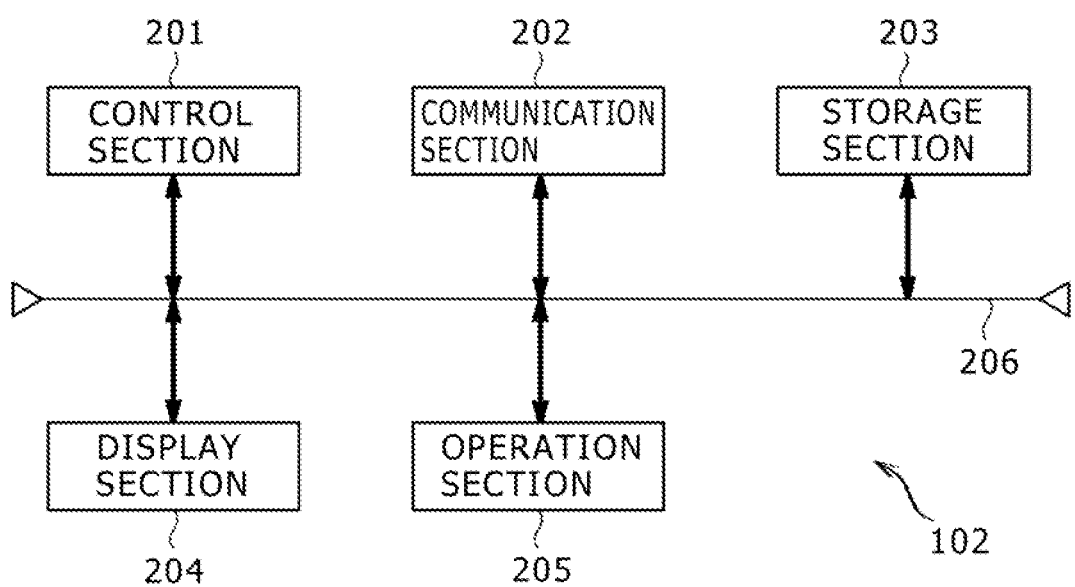
FIG. 2 is a diagram for describing a configuration of a terminal illustrated in FIG. 1.

Each of the terminals 102 includes a control section 201, communication section 202, a storage section 203, a display section 204, and an operation section 205 as illustrated in FIG. 2. It should be noted that the same sections 201 to 205 are connected together via a bus 206. The control section 201 is, for example, a CPU or MPU and operates in accordance with a program stored in the storage section 203. The storage section 203 includes, for example, an information storage medium such as a hard disk, a ROM, and a RAM and is an information storage medium that stores a program executed by the control section 201. Further, the storage section 203 also serves as a work memory of the control section 201. It should be noted that the program processed by the control section 201 may be, for example, downloaded via the network 101 and supplied. Alternatively, the program may be supplied on a variety of computer-readable information recording media such as a CD-ROM or a DVD-ROM. The operation section 205 includes interfaces such as a keyboard, a mouse, a controller, and buttons and outputs the detail of an operation instructed by a user in accordance with the operation. The display section 204 is, for example, a liquid crystal, CRT or organic EL display and displays information in accordance with an instruction from the control section 201.

The above configuration of the terminal 102 is merely an example, and the present invention is not limited thereto. On the other hand, each of the database 105 and the management server 103 includes the control section 201, the communication section 202, and the storage section 203 similar to those described above. Therefore, a detailed description thereof is omitted.

Figure 3:
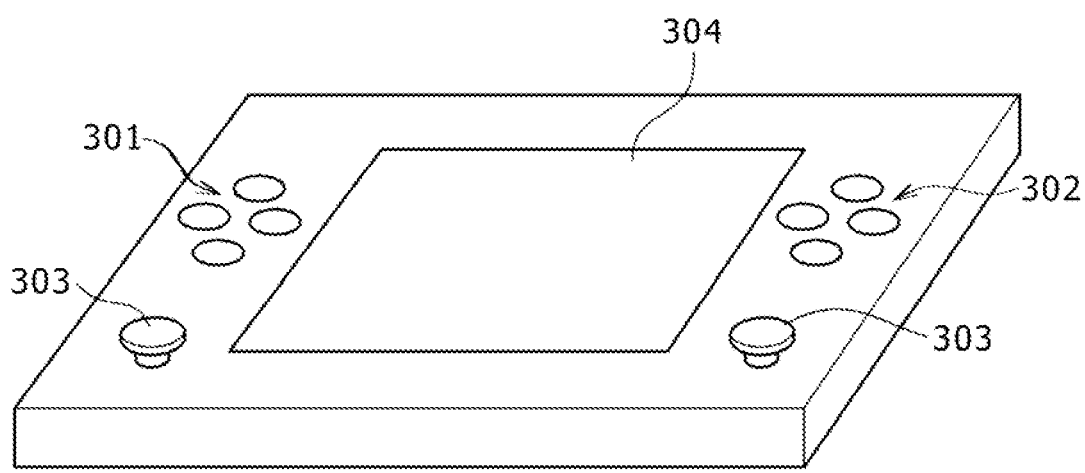
FIG. 3 is a diagram illustrating an example of appearance of the terminal illustrated in FIG. 1.

FIG. 3 is a diagram illustrating an example of appearance of the terminal. As illustrated in FIG. 3, the terminal 102 has direction keys 301, a plurality of buttons 302, an analog operation section 303 as the operation section 205, and a display screen 304 as the display section 204.

The direction keys 301 include, for example, up, down, right and left arrow keys. The user moves, for example, an on-screen target up, down, to the left or right using one of the direction keys 301. On the other hand, each of the plurality of buttons 302 is marked, for example, "a," "b," "c," or "d." By pressing each of these buttons 302, the user can perform a process in response to the button pressed. The processes performed by pressing the buttons are determined by an application executed. It should be noted that the plurality of buttons 302 may be so-called analog buttons that allow processes to be performed in response to the strength with which or the distance by which these buttons are pushed in by the user.

The analog operation section 303 can be, for example, tilted relative to a given reference position. The user enters input information which is responsive to how much the analog operation section 303 is tilted relative to the reference position and the tilting direction thereof. For example, the user can tilt a target on the display screen 304 as much as he or she wishes in the desired direction in response to how much the analog operation section 303 is tilted and the tilting direction thereof. On the other hand, the display screen 304 corresponds to the display screen 304 of the display section 204 and displays an image or other information responsive to an application.

It should be noted that the appearance of the terminal 102 and the configurations of the operation section 205 and the display section 204 shown in FIG. 3 are merely examples, and that the present invention is not limited thereto. For example, the operation section 205 may be formed with a touch panel displayed on the display section 204. The display section 204 may be a display screen such as a monitor formed on a CRT or liquid crystal display device. Further, the direction keys 301, the plurality of buttons 302, and the analog operation section 303 may be different in number or shape. Still further, the terminal 102 may have other buttons such as a start button and a select button (not shown), and an acceleration sensor and other elements.

Figure 4:
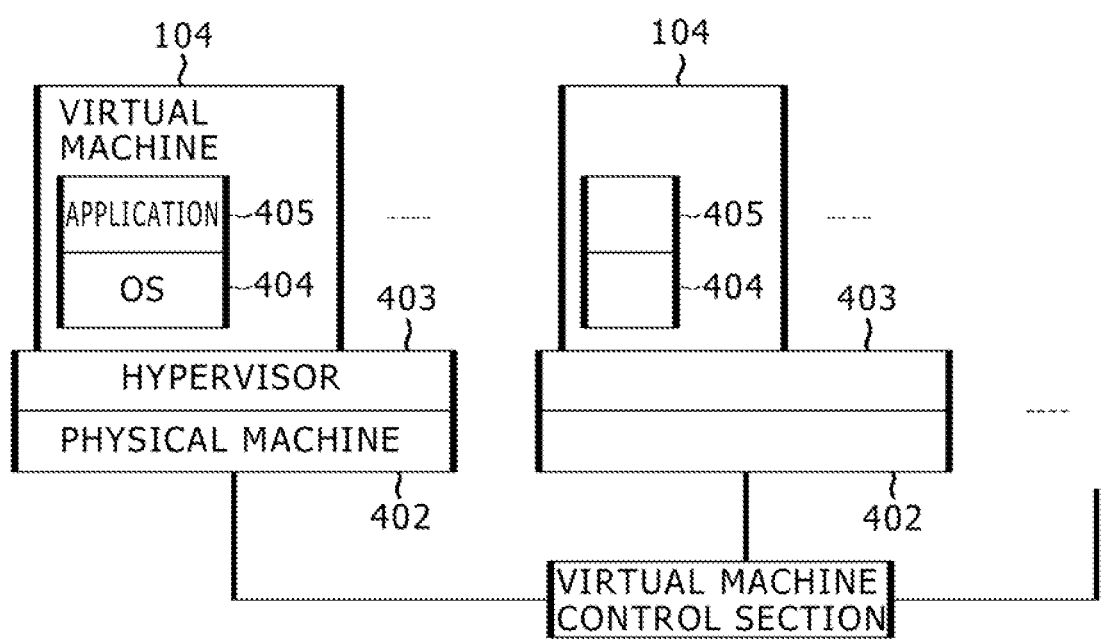
FIG. 4 is a diagram for describing a virtual machine illustrated in FIG. 1.

FIG. 4 is a diagram for describing the virtual machine illustrated in FIG. 1. As illustrated in FIG. 4, the cloud infrastructure 100 includes a virtual machine control section 401 and a group of physical machines 402 connected to the virtual machine control section 401.

As illustrated in FIG. 4, a hypervisor 403 is installed on each of the physical machines 402, and one or a plurality of virtual machines (VMs) 104 runs on each of the hypervisors 403. It should be noted that the hypervisor 403 is software that runs and controls the virtual machines 104 on each of the physical machines 402 without need for assistance from general-purpose OSes. As is well known, the virtual machine 104 is a virtually generated set of a CPU and memories. It should be noted that, needless to say, each of the physical machines 402 is a computer formed with a CPU, memories, and other elements.

Each of the virtual machines 104 has an OS 404 and an application 405. The above program processed by the virtual machine 104 corresponds to one of the applications 405. The virtual machine control section 401 generates one or the plurality of virtual machines 104 on the physical machine 402. More specifically, this is accomplished by assigning resources (e.g., resources such as CPU processing time and memory capacity) of the physical machine 402 to the virtual machine 104 via the hypervisor 403 and controlling these resources.

That is, the installation of a program and the execution thereof in the virtual machine 104 which will be described below are actually handled by the physical machine 402. For example, a plurality of programs including the program according to the present embodiment is stored in the storage section of the physical machine 402 made up of memories and other elements. The program according to the present embodiment is actually executed by one or a plurality of CPUs of the physical machine 402. At this time, one or the plurality of CPUs of the physical machine 402 is also used to execute the above plurality of programs. For example, the processing times of one or the plurality of CPUs are divided, and part thereof is assigned to the execution of the program according to the present embodiment. It should be noted that the above configuration of the virtual machines and other elements are merely an example, and that the present invention is not limited thereto.

Figure 5:
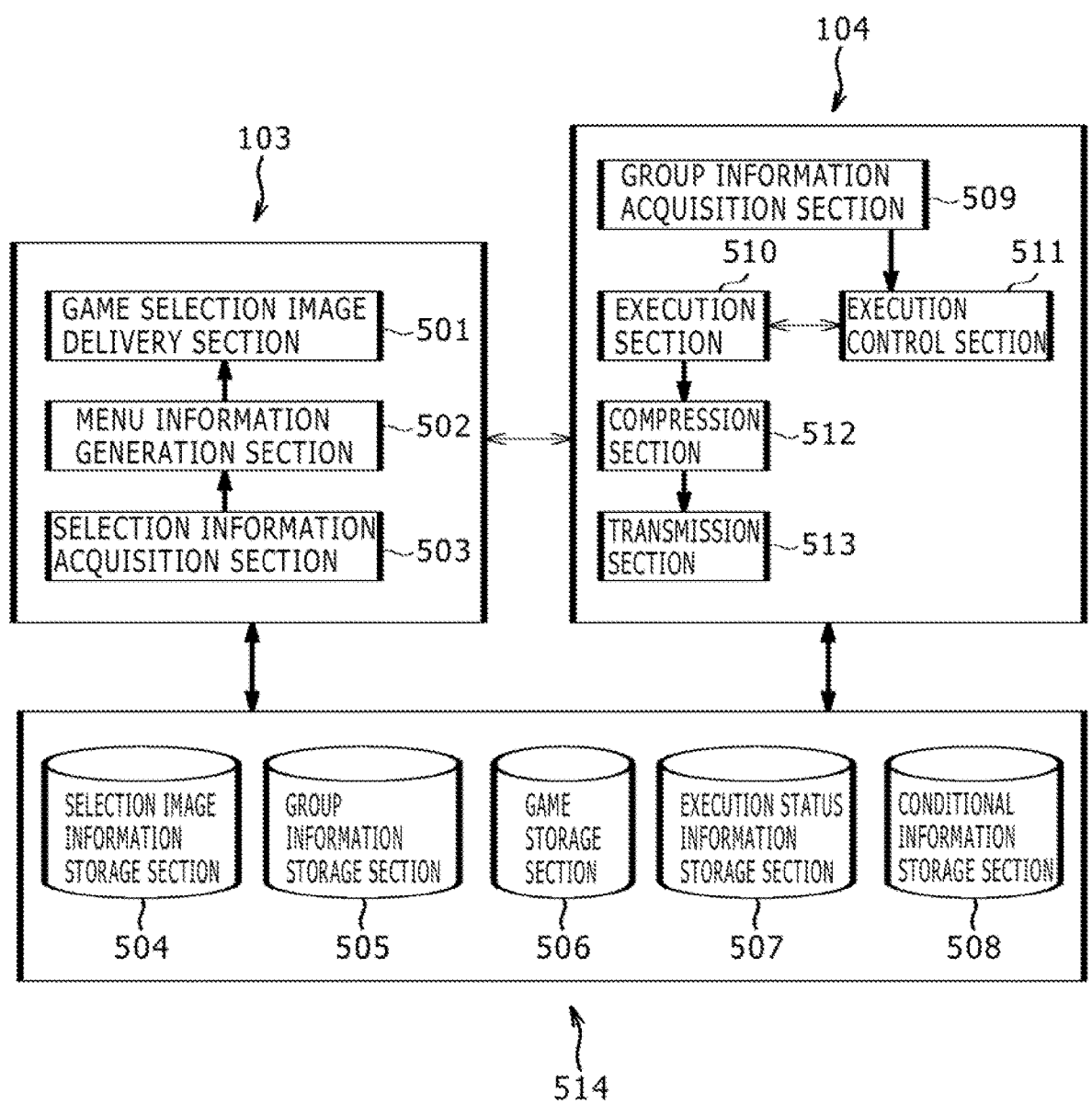
FIG. 5 is a diagram for describing an example of a functional configuration of the information processing system according to the embodiment of the present invention.

FIG. 5 is a diagram for describing an example of a functional configuration of the information processing system according to the embodiment of the present invention. As illustrated in FIG. 5, the information processing system 110 includes, in terms of functionality, the management server 103, the virtual machines 104, and a storage section 514. The storage section 514 includes, for example, a DB 105. It should be noted that the functional configuration of the information processing system 110 shown below is merely an example, and that the present invention is not limited thereto. On the other hand, the terminals 102 are not illustrated in FIG. 5 for reasons of simplification. However, the terminals 102 are connected to the management server 103 and the appropriate virtual machines 104.

Figure 6:
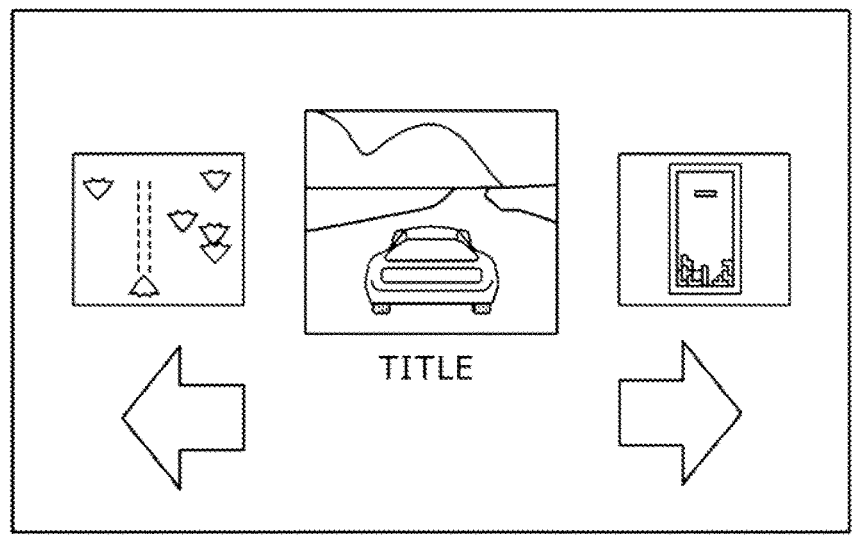
FIG. 6 is a diagram illustrating an example of a game selection image delivered to the terminal according to the embodiment of the present invention.
Figure 7A:
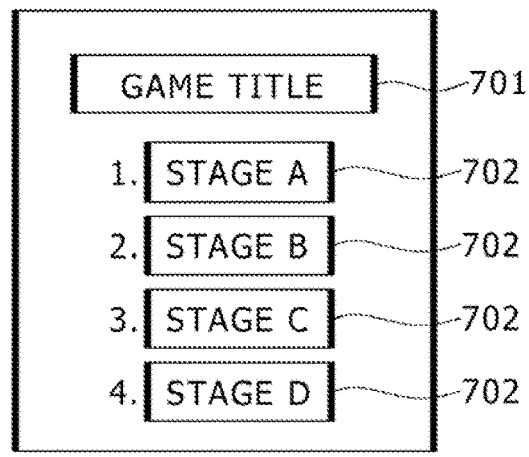
FIG. 7A illustrates an example of content information representing contents of a plurality of mini-games according to the embodiment of the present invention.
Figure 7B:
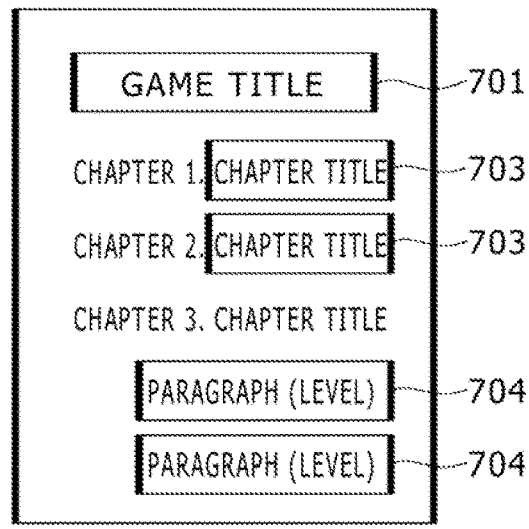
FIG. 7B illustrates another example of content information representing contents of a plurality of mini-games according to the embodiment of the present invention.
Figure 7C:
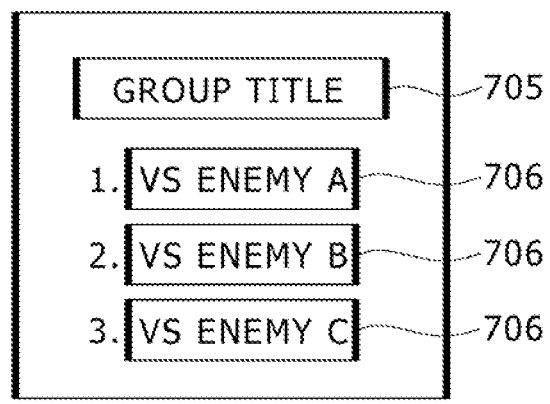
FIG. 7C illustrates still another example of content information representing contents of a plurality of mini-games according to the embodiment of the present invention.

Further, a description will be given below using examples illustrated in FIGS. 6 and 7A to 7C for reasons of simplification. Here, FIG. 6 illustrates an example of a game selection image delivered to the terminals. FIGS. 7A to 7C illustrate examples of content information representing contents of a plurality of mini-games. Content information is displayed after a given game is selected in the game selection image illustrated in FIG. 6. These mini-games make up the selected game. Further, for example, the game selected in the game selection image illustrated in FIG. 6 includes a group of mini-games as described later. A group of mini-games is formed with part of an existing game (e.g., stages or chapters) or parts of a plurality of existing games (e.g., battles with specific enemy characters).

A description will be given first of an example of a functional configuration of the management server 103. As illustrated in FIG. 5, the management server 103 includes, for example, a game selection image delivery section 501, a menu information generation section 502, and a selection information acquisition section 503.

The game selection image delivery section 501 delivers, in response to a request for delivery of a game selection image from each of the terminals 102, a game selection image to each of the appropriate terminals 102. More specifically, for example, the game selection image delivery section 501 delivers, together with images representing the contents of the mini-games (group of mini-games), a game selection image showing related information such as titles to the terminal 102. Then, the user selects a desired game from the game selection image shown on the terminal 102. The selection information acquisition section 503 acquires a game selection instruction from the terminal 102. The game selection instruction includes, for example, a group ID appropriate to the game selected in the game selection image. It should be noted that the details of the group ID will be described later. On the other hand, the game selection image is generated, for example, using selection image information stored in a selection image information storage section 504 and delivered. For example, the selection image information storage section 504 stores, for each selected game (group of mini-games), selection image information including related information such as initial image and title of each game displayed in the selection image. Further, the selection image information storage section 504 stores, for example, content information of each of the mini-games which will be described later in association with a content information ID.

The menu information generation section 502 generates content information (menu information) representing the contents of a plurality of mini-games making up the selected game as illustrated, for example, in FIGS. 7A to 7C. The menu information generation section 502 does so based on the game selection instruction acquired from the terminal 102, group information stored in a group information storage section 505, and content information stored in the selection image information storage section 504. Group information stored in the group information storage section 505 will be described later. The menu information is transmitted, for example, by the game selection image delivery section 501 to the terminal 102 and displayed on the display section 204 of the terminal 102. Then, the user refers to the content information and selects a desired mini-game. The selection information acquisition section 503 acquires the mini-game selection information. As a result, each mini-game is displayed together with content information (e.g., stages making up the mini-game and character name of the opponent). This makes it easy for the user to select a desired mini-game. It should be noted that the mini-game selection information includes, for example, an execution status information ID appropriate to the selected mini-game. The execution status information ID will be described later.

Here, the group information storage section 505 stores group IDs, execution status information IDs, and content information IDs in association with each other as illustrated in FIG. 8. The group information storage section 505 may further store game IDs, priority information, conditional information IDs which will be described later and other information in association with each other.

A group ID is appropriate, for example, to each game (set of mini-games) selected in the above game selection image and corresponds to identification information identifying groups such as execution status information ID which will be described later.

A content information ID corresponds to content information representing the content of each of the above mini-games. Content information is, for example, identification information identifying mini-game title, stage name, opponent character name, given image information, and so on. Therefore, the menu information generation section 502 generates content information representing the content of each mini-game by referring to the content information ID stored in association with the group ID included in the game selection instruction. The content information may be specified in advance. Alternatively, the user may be able to specify desired content information.

An execution status information ID corresponds to identification information identifying execution status information appropriate to each mini-game. Here, execution status information corresponds to execution status information (e.g., values of memories, registers, and program counters) of a game console reproduced by an execution section 510. The execution section 510 which will be described later is, for example, an emulator or a simulator. If a game console is incorporated, execution status information corresponds to values of memories, registers, program counters, and so on of the game console and corresponds to so-called snapshots and save data. It should be noted that as an existing game program or a game program designed for execution on a dedicated game console, for example, is executed using the execution status information, it is possible to configure a mini-game that allows part of the existing game program or other program to be executed from a given position (e.g., stage or chapter of the game) or a given status (e.g., given score or given level). That is, each mini-game is appropriate to one piece of execution status information.

A game ID corresponds to identification information identifying a game program. The game program corresponds, for example, to an existing program or a game program designed for execution on a dedicated console as described above.

Priority information corresponds to priority information representing the sequence of execution of execution status information included in a group identified by a group ID. That is, if, for example, a game appropriate to a group is selected, and if a plurality of mini-games included in the game is executed one after the other, the mini-games are sequentially executed in accordance with the priority information. It should be noted that if the user selects the mini-games at will, priority information may be not included or all priority information may have the same priority.

A conditional information ID corresponds to identification information identifying conditional information representing a variety of conditions such as a condition for terminating each mini-game or a condition for performing a preset process in the middle of each mini-game (e.g., displaying a ranking, i.e., a process not included in the original game program from which the mini-games derive). It should be noted that although a case has been described with reference to FIG. 8 in which identification information such as execution status information IDs and conditional information IDs are stored, information such as execution status information and conditional information identified by execution status information IDs and conditional information IDs may be directly stored. On the other hand, information such as execution status information and conditional information in the claims includes a case in which these pieces of information are stored as identification information.

Here, execution status information IDs included in the groups may overlap as illustrated in FIG. 8. Further, execution status information IDs included in the groups may include different game IDs. In this case, for example, it is possible to group mini-games made up of a plurality of existing game programs or game programs designed for execution on a dedicated game console. Therefore, it is possible to group games made up of a set of given parts of serialized game programs (e.g., battles with last enemy characters). It should be noted that although one content information ID is associated with each piece of execution status information in FIG. 8, one content information ID may be, for example, associated with each group.

A detailed description will be given next of a specific example of content information displayed on the display section 204 of the terminal 102. As illustrated in FIG. 7A, if the selected game is made up, for example, of a group of mini-games of various stages, stage names 702 such as stage A are displayed together with a title 701 of the selected game. Then, as the user instructs the selection of the name 702 of an arbitrary stage via the operation section 205 of the terminal 102, the execution of the mini-game begins which is appropriate to the title 702.

As illustrated in FIG. 7B, if the selected game is, for example, a so-called RPG game made up of mini-games, one for each chapter, titles 703 representing the contents of various chapters are displayed together with the game title 701. In this case, if, for example, the mini-games are further divided into character levels and paragraphs, information representing the levels and contents 704 of the paragraphs may be displayed. Then, as the user instructs the selection of the arbitrary title 703 or the information 704 indicating a level via the operation section 205 of the terminal 102, the execution of the mini-game begins which is appropriate to the arbitrary title 703 or the information 704 indicating the level.

As illustrated in FIG. 7C, for example, if the selected game is made up of mini-games, i.e., parts of a plurality of serialized games (e.g., battles with last enemy characters), contents representing the parts (e.g., contents 706 including the names of enemy characters) are displayed together with a group title 705, a generic name of the series. In this case, a subtitle (e.g., boss battle in the case of the above example) may be displayed as the title 705 together with the name common to the series.

Further, an administrator may specify the contents such as the group title 705 in advance. Alternatively, the user or his or her representative may be able to specify the contents. Still alternatively, if the contents are specified in advance in the original game program, the specified contents may be used. It should be noted that menu information illustrated in FIGS. 7A to 7C are merely examples and can be modified in various ways. For example, related information may be displayed. Such related information includes information relating, for example, to scores of mini-games of other users.

A description will be given next of an example of a functional configuration of each of the virtual machines 104. As illustrated in FIG. 5, each of the virtual machines 104 includes, for example, a group information acquisition section 509, the execution section 510, an execution control section 511, a compression section 512, and a transmission section 513. It should be noted that although only one of the virtual machines 104 is illustrated in FIG. 5, as many virtual machines 104 as appropriate, for example, for the number of the terminals 102 connected to the information processing system 110 are included. In the description given below, on the other hand, a case will be described, for reasons of simplification, in which the game appropriate to group ID "G1" illustrated in FIG. 8 is selected in the game selection screen, and in which the mini-game appropriate to execution status information ID "SA" is further selected when menu information representing the content of each of the mini-games is displayed.

For example, the group information acquisition section 509 acquires, from the management server 103, the group ID and the execution status information ID acquired by the management server 103 when a game (group) and a mini-game are selected as described above. Further, the group information acquisition section 509 acquires, from the group information acquisition section 509, group information including the group ID and the execution status information ID. More specifically, in the case of the above example, group information is acquired together with group ID "G1" and execution status information ID "SA." Group information includes, for example, the execution status information ID, game ID and so on associated with group ID "G1."

The execution section 510 is, for example, an emulator or simulator as described above, and executes the game program based on a control signal supplied from the execution control section 511 which will be described later. In the above case, for example, because the game appropriate to group ID "G1" and the mini-game appropriate to execution status information ID "SA" are selected, the game program identified by game ID "g1" is executed using execution status information ID "SA."

The execution control section 511 acquires not only the game program from a game storage section 506 based on the game ID and the execution status information ID included in the acquired group information but also the execution status information represented by the execution status information ID from an execution status information storage section 507. Then, the execution control section 511 causes the execution section 510 to execute the acquired game program using the acquired execution status information. It should be noted that the game storage section 506 and the execution status information storage section 507 store each game program and each piece of the execution status information, for example, in association with one of the game IDs and one of the execution status information IDs illustrated in FIG. 8.

Figure 9:
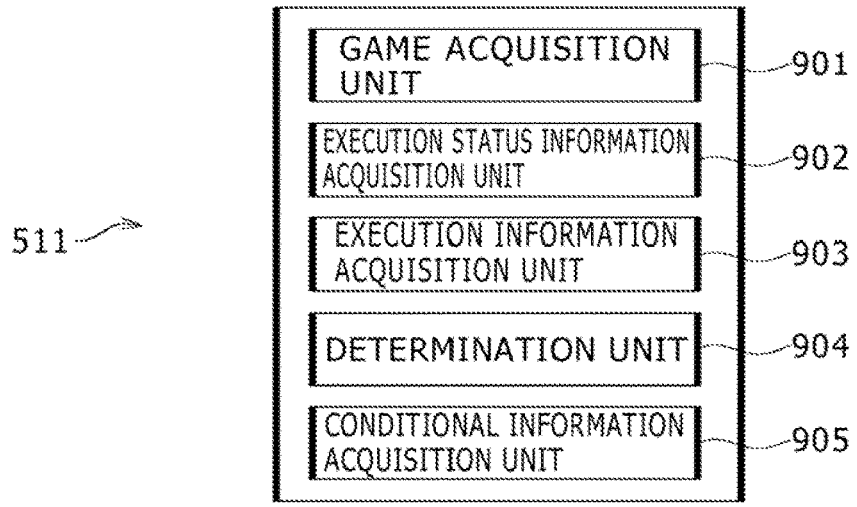
FIG. 9 is a diagram for describing a functional configuration of an execution control section according to the embodiment of the present invention.

More specifically, the execution control section 511 includes, for example, a game acquisition unit 901, an execution status information acquisition unit 902, an execution information acquisition unit 903, a determination unit 904, and a conditional information acquisition unit 905 as illustrated in FIG. 9.

The game acquisition unit 901 acquires, for example, the game program identified by the acquired game ID. In the above case, because the game appropriate to group ID "G1" and the mini-game appropriate to execution status information ID "SA" are selected, and game ID "g1" is stored in association with execution status information ID "SA," the game acquisition unit 901 acquires the game program identified by game ID "g1" from the game storage section 506.

The execution status information acquisition unit 902 acquires the execution status information represented by the acquired execution status information ID. In the above case, for example, the execution status information acquisition unit 902 acquires the execution status information appropriate to execution status information ID "SA" from the execution status information storage section 507.

The execution information acquisition unit 903 acquires execution information of a game generated by the execution section 510 (game execution information) such as image and sound information generated as a result of execution of a game and execution status information of the execution section 510. Here, as described above, the execution status information corresponds to execution status information (e.g., values of memories, registers, and program counters) of a game console reproduced by an emulator or simulator as the execution section 510. The execution status information corresponds, if a game console is incorporated, to the execution status information of the game console. More specifically, for example, when the game program having game ID "g1" is executed using execution status information ID "SA" in the above case, the execution information acquisition unit 903 acquires image and sound information, execution status information of the execution section 510, and so on based on the execution of the game.

The conditional information acquisition unit 905 acquires, for example, conditional information identified by the conditional information ID stored in association with the execution status information ID acquired from a conditional information storage section 508. In the above case, for example, conditional information ID "R1" is stored in association with execution status information ID "SA." Therefore, the conditional information acquisition unit 905 acquires the conditional information identified by conditional information ID "R1." Here, conditional information corresponds to information representing a variety of conditions such as a condition for terminating each mini-game as described above.

The determination unit 904 acquires the game execution information acquired by the execution information acquisition unit 903 and the conditional information acquired by the conditional information acquisition unit 905. Then, the determination unit 904 determines, for example, whether the game execution information (e.g., image information) matches a given condition represented by the above conditional information. More specifically, for example, the determination unit 904 compares the image, character, sound information, or execution status information specified in advance as conditional information with the execution information (e.g., image, character and sound information, or execution status information) generated by the execution section 510. The determination unit 904 does so by using so-called image, character or sound recognition or other technique, thus determining whether the execution information matches the conditional information. Still more specifically, for example, if the conditional information is a condition relating to the termination of a mini-game, the determination unit 904 recognizes the display of goals or the display of the outcome of a head-to-head game specified in advance as the conditional information, thus determining whether the execution information matches the condition for terminating the appropriate mini-game.

It should be noted that when proceeding to a next mini-game after the termination of one mini-game of a group, the execution control section 511 may cause the execution information acquisition unit 903 to acquire part of partial information corresponding, for example, to the score from the execution status information at the time of the termination of the one mini-game. Then, the execution control section 511 may replace the part of partial information corresponding to the score with part of partial information appropriate to execution status information that is, in turn, appropriate to the next mini-game acquired by the execution status information acquisition unit 902 and use the execution status information appropriate to the next mini-game. This makes it possible to take over the execution result of the previous mini-game when the next mini-game is executed. It should be noted that whether to proceed to a next mini-game and whether to take over the game result after the termination of one mini-game of a group can be specified, for example, by the user or the game (group) designer.

The compression section 512 compresses image information (including movie information), sound information and so on generated as a result of execution of a mini-game by the execution section 510. The transmission section 513 transmits the compressed image information and other information to the appropriate terminal 102. Then, the terminal 102 decompresses the compressed image information and other information and displays the decompressed information on the display section 204. In other words, each of the mini-games is delivered to the terminal 102 by so-called streaming and played. It should be noted that the functional configuration of the information processing system 110 illustrated above is merely an example, and that the present invention is not limited thereto.

A description will be given next of an example of flow of the information processing system 110 according to the present embodiment with reference to FIG. 10. It should be noted that a case will be described below as an example of flow of the information processing system 110 according to the present embodiment in which a selected game (group of mini-games) is executed in a preset sequence. However, the flow of the information processing system 110 according to the present embodiment is not limited thereto. Instead, needless to say, other flow may be used such as selection of a next mini-game by the user again after selection of one mini-game.

Figure 10:
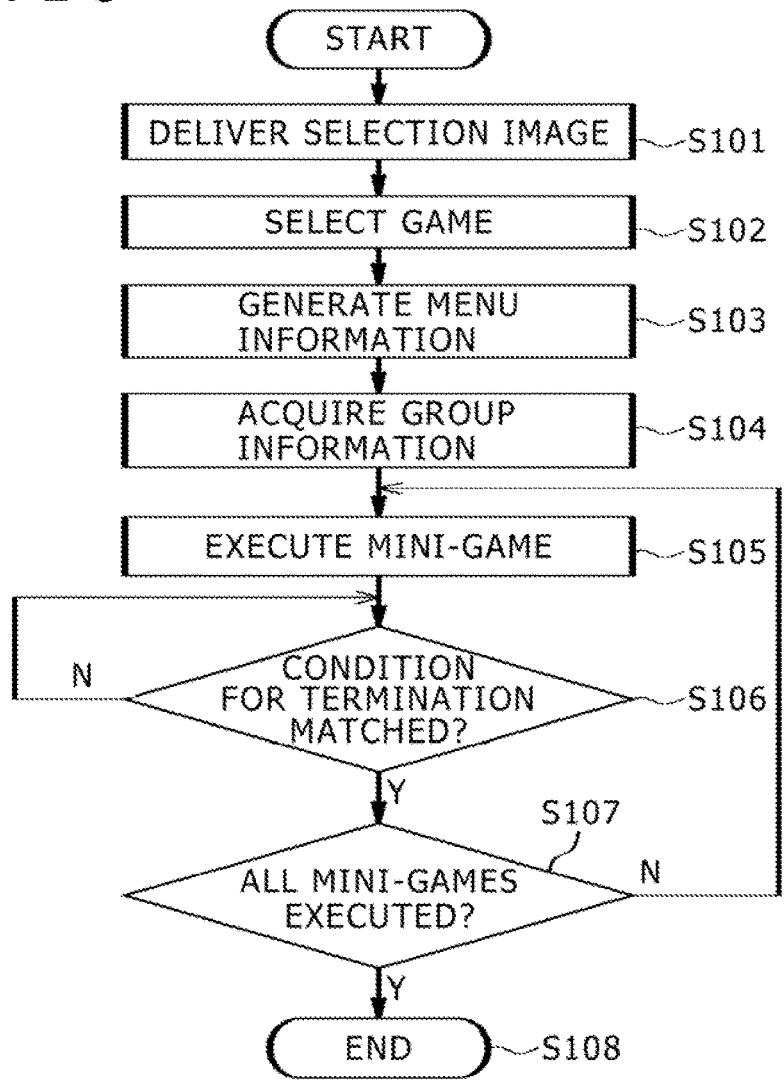
FIG. 10 is a diagram for describing an example of flow of the information processing system according to the present embodiment.

FIG. 10 is a diagram outlining the flow of the process handled by the present information processing system 110 when the selected game (group of mini-games) is set to have mini-games executed in a preset sequence. It should be noted that a description will be given assuming that the game selected in this case correspond to one identified by group ID "G1" illustrated in FIG. 8.

The game selection image delivery section 501 delivers a game selection image in response to a request for delivery of a game selection image from the terminal 102 (S101). Then, the user selects a desired game (group) (S102). Here, we assume that a game appropriate to group ID "G1" is selected as described above.

The menu information generation section 502 generates menu information representing content information identified by the content information ID appropriate to group ID "G1." The menu information is delivered to the appropriate terminal 102 and displayed on the display section 204 of the terminal 102 (S103). It should be noted that the displayed menu information is appropriate, for example, to that illustrated in FIG. 7A.

The group information acquisition section 509 of the virtual machine 104 appropriate to the terminal 102 acquires group ID "G1" (S104). Then, the execution control section 511 refers to group ID "G1" acquired in S104 and acquires execution status information ID "SA" and conditional information ID "R1" stored in association with the game ID whose priority is "1." Then, the execution control section 511 causes the execution section 510 to execute the game program identified by game ID "g1" whose priority is "1" using the execution status information identified by execution status information ID "SA." This starts the execution of the mini-game whose priority is "1" in the group appropriate to group ID "G1" (S105).

The execution information acquisition unit 903 acquires execution information including image information and other information generated as a result of execution of the above game program. Then, the determination unit 904 determines whether the acquired execution information matches the conditional information (described in this case as corresponding to the termination condition) identified by the above conditional information ID (S106). If the determination unit 904 determines that the termination condition is not matched, the execution of the mini-game is continued.

On the other hand, when determining that the termination condition is matched, the determination unit 904 determines whether all the mini-games belonging to the group have been executed. That is, the determination unit 904 determines whether the execution status information IDs identified by all the execution status information IDs appropriate to group ID "G1" have been used (S107). When the determination unit 904 determines that all the mini-games have been executed, the process is terminated (S108). On the other hand, if the determination unit 904 determines that all the mini-games have yet to be executed, control returns to S105, and the mini-game with the next priority information is executed.

The present embodiment allows to group a set of mini-games made up of parts of one or a plurality of game programs and manage these mini-games. Further, the present embodiment allows to display content information representing the content of each mini-game and display the content thereof in the form of a table of contents. Therefore, the user can readily understand, select, and play a mini-game made up of desired parts of one or a plurality of game programs (e.g., given stages, given levels and scores, or battles with given enemy characters). Further, a group (game) may be made up of a group of mini-games that are, in turn, made up of parts of a plurality of existing serialized games or those designed for execution on a dedicated console. In this case, for example, it is possible to form a game by grouping the battles only with the last enemy characters, for example, in so-called serialized RPG games, thus responding to various user needs. Alternatively, the user may be allowed to group mini-games. In this case, the user can create grouped games (e.g., famous scenes of games) made up of a plurality of desired stages.

It should be noted that the functional configuration and the process flow of the information processing system 110 illustrated above are merely examples, and that the present invention is not limited thereto. For example, the elements of the management server 103 may be partially or wholly provided in the virtual machine 104. Conversely, the elements of the virtual machine 104 may be partially or wholly provided in the management server 103. Alternatively, the elements of the storage section 514 may be partially or wholly provided in the management server 103 or the virtual machine 104. Still alternatively, the elements of the virtual machine 104 or the storage section 514 may be wholly or partially provided in the terminal 102. More specifically, for example, the elements of the above virtual machine 104 and those of the group information storage section 505 may be also provided in the terminal 102 so that different information is included in menu information in accordance with whether the terminal 102 is connected to the management server 103 and the virtual machine 104. More specifically, for example, menu information may include, in online mode, content information about mini-games that cannot be played in offline mode, but may not include such content information in offline mode. Alternatively, in this case, the condition in relation to mini-games (e.g., condition for determining the termination) may change between online and offline modes. For example, in offline mode, the user may only play mini-games. In online mode, the user may register score information and ranking information at the termination of a game in the management server 103 and points or medals may be granted the mini-games by the user in accordance, for example, with the score information. That is, for example, user identification information may be registered in association with information representing points or medals. It should be noted that, in this case, the user may be able to use the points or medals to purchase a mini-game or play such a game. Although a case has been described above in which the information processing system 100 is formed using the so-called cloud infrastructure 100, the present invention is not limited thereto. For example, the information processing system 100 may be formed using an ordinary server system.

Further, although a case has been described in the above flow in which mini-games are set up in such a manner as to be terminated one after another, the user may proceed to the mini-game with the next priority information only when the determination unit 904 determines, for example, that the game result (e.g., score or time) specified for each mini-game meets a given condition. Alternatively, although, in the above flow, a case has been described in which mini-games are executed in order of priority information, needless to say, the user may select, at will, each of the mini-games included in the game (group of mini-games) selected by the user. Still alternatively, the user may be able to select only some of the mini-games in a group at first. However, only when a given condition is met, the user may be able to select some other mini-games. Still alternatively, the above priority may be dynamically changed in accordance with the result of a mini-game, or the sequence or number of mini-games that can be executed next may be changed in accordance with the game result of a mini-game under execution.

Still alternatively, although it has been described above that execution status information appropriate to each of the mini-games included in a game (group) is stored in advance, it may be possible to group and store execution status information which is the game results of the user. Still alternatively, other users may be able to use the execution status information. Still alternatively, execution status information to be grouped is not limited thereto. Instead, for example, this information may be part or whole of execution status information owned by one user or a given group of users, or execution status information stored in the system may be partially or wholly grouped. It should be noted that the menu information acquisition means and the display means of the claims correspond, for example, to the control section 201 and the display section 204, respectively.

The invention claimed is:

1. An information processing system comprising:
a circuit operating to execute at least one selected application for interactive gameplay by a user, where interactive gameplay by a user includes moving player objects versus other game objects in response to the user providing input commands via a game controller to the circuit operating to execute during the interactive gameplay;
a circuit operating to store group information, the group information including a plurality of sets of associated elements concerning the at least one selected application being executed, each set of associated elements including: (i) a plurality of pieces of execution status information each of which represents a respective execution status of one of a plurality of sections of the at least one selected application program, where each one of the plurality of sections is a respective different stage at a respective different point of execution in the at least one selected application program, (ii) a plurality of pieces of content information, each of which represents one of a plurality of pieces of content for a respective one of the plurality of pieces of execution status information, including one or more images used in the execution of the at least one selected application, and (iii) group identification information identifying respective groups, which are the respective sets of associated elements, to which the plurality of pieces of execution status information and the plurality of pieces of content information belong;

a circuit operating to generate, based on the group information, menu information which displays the content information included in at least one of the groups such that the user may select one or more of the plurality of sections of the at least one selected application for interactive gameplay; and a circuit operating to store the user's selection of the one or more of the plurality of sections to identify and create a user-specified group game made from the one or more of the plurality of sections of the at least one selected application, wherein the circuit operating to execute executes the user-specified group game by executing the selected one or more of the plurality of sections of the at least one selected application for interactive gameplay on a preferential basis using the execution status information associated with the content information included in the at least one of the groups.

2. The information processing system of claim 1, further comprising:

a circuit operating to acquire execution information from the circuit operating to execute based on execution of the at least one application, where the execution information includes at least one of image data, game character data, and sound data; and a circuit operating to determine whether the execution information acquired by the circuit operating to acquire matches a given condition by carrying out at least one of image recognition on the image data, character recognition on the game character data, and sound recognition on the sound data, wherein at least one of:

the information processing system terminates the execution of the at least one application in accordance with the determination result of the circuit operating to determine; and the information processing system terminates a selected particular one of the plurality of sections of the at least one selected application for interactive gameplay, and begins executing another of the plurality of sections of the at least one selected application for interactive gameplay, based on the determination result of the circuit operating to determine.

3. The information processing system of claim 2, wherein:

the execution information acquired by the circuit operating acquire includes execution status information representing the execution status of the circuit operating to execute, and the plurality of pieces of execution status information includes the execution status information acquired by the circuit operating to acquire.

4. The information processing system of claim 3 further comprising:

a circuit operating to acquire partial information representing given information of the execution information acquired by the circuit operating to acquire execution information, wherein the circuit operating to execute further executes the at least one application using the partial information.

5. The information processing system of claim 1, wherein:

the group information is further associated with priority identification information identifying a priority representing a sequence of execution of the execution status information, and the circuit operating to execute acquires the execution status information based on the priority identification information and executes the at least one application.

6. The information processing system of claim 1, wherein the group information is further associated with application identification information identifying the application to be executed using each piece of the execution status information, and the circuit operating to execute further executes the application identified by each piece of the application identification information.

7. A computer including a processor operating under the control of an information processing program, which causes the computer to execute actions, comprising:

executing at least one selected application for interactive gameplay by a user, where interactive gameplay by a user includes moving player objects versus other game objects in response to the user providing input commands via a game controller to a circuit operating to execute the at least one selected application during the interactive gameplay;

storing group information, the group information including a plurality of sets of associated elements concerning the at least one selected application being executed, each set of associated elements including: (i) a plurality of pieces of execution status information each of which represents a respective execution status of one of a plurality of sections of the at least one selected application program, where each one of the plurality of sections is a respective different stage at a respective different point of execution in the at least one selected application program, (ii) a plurality of pieces of content information, each of which represents one of a plurality of pieces of content for a respective one of the plurality of pieces of execution status information, including one or more images used in the execution of the at least one selected application, and (iii) group identification information identifying respective groups, which are the respective sets of associated elements, to which the plurality of pieces of execution status information and the plurality of pieces of content information belong;

generating, based on the group information, menu information which displays the content information included in at least one of the groups such that the user may select one or more of the plurality of sections of the at least one selected application for interactive gameplay;

storing the user's selection of the one or more of the plurality of sections to identify and create a user-specified group game made from the one or more of the plurality of sections of the at least one selected application; and executing the user-specified group game by executing the selected one or more of the plurality of sections of the at least one selected application for interactive gameplay on a preferential basis using the execution status information associated with the content information included in the at least one of the groups.

8. An information processing server comprising:

a circuit operating to execute at least one selected application for interactive gameplay by a user, where interactive gameplay by a user includes moving player objects versus other game objects in response to the user providing input commands via a game controller to the circuit operating to execute the at least one selected application during the interactive gameplay;

a circuit operating to acquire group information, the group information including a plurality of sets of associated elements concerning the at least one selected application being executed, each set of associated elements including: (i) a plurality of pieces of execution status information each of which represents a respective execution status of one of a plurality of sections of the at least one selected application program, where each one of the plurality of sections is a respective different stage at a respective different point of execution in the at least one selected application program, (ii) a plurality of pieces of content information, each of which represents one of a plurality of pieces of content for a respective one of the plurality of pieces of execution status information, including one or more images used in the execution of the at least one selected application, and (iii) group identification information identifying respective groups, which are the respective sets of associated elements, to which the plurality of pieces of execution status information and the plurality of pieces of content information belong;

a circuit operating to generate, based on the group information, menu information which displays the content information included in at least one of the groups, such that the user may select one or more of the plurality of sections of the at least one selected application for interactive gameplay; and a circuit operating to store the user's selection of the one or more of the plurality of sections to identify and create a user-specified group game made from the one or more of the plurality of sections of the at least one selected application, wherein the circuit operating to execute executes the user-specified group game by executing the selected one or more of the plurality of sections of the at least one selected application for interactive gameplay on a preferential basis using the execution status information associated with the content information included in the at least one of the groups.

9. An information processing terminal comprising:

a circuit operating to receive information concerning an execution of at least one selected application for interactive gameplay by a user, where interactive gameplay by a user includes moving player objects versus other game objects in response to the user providing input commands via a game controller to a circuit operating to execute the at least one selected application during the interactive gameplay;

a circuit operating to acquire menu information which displays content information included in at least one of groups based on group information, the group information including a plurality of sets of associated elements concerning the at least one selected application being executed, each set of associated elements including: (i) a plurality of pieces of execution status information each of which represents a respective execution status of one of a plurality of sections of the at least one selected application program, where each one of the plurality of sections is a respective different stage at a respective different point of execution in the at least one selected application program, (ii) a plurality of pieces of content information, each of which represents one of a plurality of pieces of content for a respective one of the plurality of pieces of execution status information, including one or more images used in the execution of the at least one selected application, and (iii) group identification information identifying respective groups, which are the respective sets of associated elements, to which the plurality of pieces of execution status information and the plurality of pieces of content information belong;

a display operating to display, based on the group information, the acquired menu information, which displays the content information included in at least one of the groups such that the user may select one or more of the plurality of sections of the at least one selected application for interactive gameplay; and a circuit operating to store the user's selection of the one or more of the plurality of sections to identify and create a user-specified group game made from the one or more of the plurality of sections of the at least one selected application, wherein the circuit operating to execute executes the user-specified group game by executing the selected one or more of the plurality of sections of the at least one selected application for interactive gameplay on a preferential basis using the execution status information associated with the content information included in the at least one of the groups.

10. An information processing method comprising:

executing at least one selected application for interactive gameplay by a user using a circuit operating to execute, where interactive gameplay by a user includes moving player objects versus other game objects in response to the user providing input commands via a game controller to the circuit operating to execute the at least one selected application during the interactive gameplay;

storing group information, the group information including a plurality of sets of associated elements concerning the at least one selected application being executed, each set of associated elements including: (i) a plurality of pieces of execution status information each of which represents a respective execution status of one of a plurality of sections of the at least one selected application program, where each one of the plurality of sections is a respective different stage at a respective different point of execution in the at least one selected application program, (ii) a plurality of pieces of content information, each of which represents one of a plurality of pieces of content for a respective one of the plurality of pieces of execution status information, including one or more images used in the execution of the at least one selected application, and (iii) group identification information identifying respective groups, which are the respective sets of associated elements, to which the plurality of pieces of execution status information and the plurality of pieces of content information belong;

generating, based on the group information, menu information which displays the content information included in at least one of the groups such that the user may select the one or more of the plurality of sections of the at least one selected application for interactive gameplay; and storing the user's selection of the one or more of the plurality of sections to identify and create a user-specified group game made from the one or more of the plurality of sections of the at least one selected application, wherein the executing includes executing the user-specified group game by executing the selected one or more of the plurality of sections of the at least one selected application for interactive gameplay on a preferential basis using the execution status information associated with the content information included in the at least one of the groups.

* * * * *